United States Patent [19]
Nirasawa

[11] 3,727,217
[45] Apr. 10, 1973

[54] SYSTEM FOR AVOIDING THE COLLISION OF A MOVING BODY WITH OTHER OBJECTS

[75] Inventor: Tomiji Nirasawa, Yokohama, Japan

[73] Assignee: Tokyo Keiki Co., Ltd., Tokyo, Japan

[22] Filed: Apr. 28, 1970

[21] Appl. No.: 32,515

[30] Foreign Application Priority Data

Apr. 29, 1969   Japan ..........................44/38642
    Apr. 29, 1969   Japan ..........................44/32646

[52] U.S. Cl..............................343/5 ST, 343/112 CA
[51] Int. Cl................................................G01s 7/06
[58] Field of Search........................343/5 ST, 112 CA

[56] References Cited

UNITED STATES PATENTS

| 3,114,908 | 12/1963 | Hall..................................343/5 ST X |
| 3,265,869 | 8/1966 | Gray ............................343/112 CA X |
| 3,090,043 | 5/1963 | Wilkenson ......................343/5 ST X |
| 3,109,060 | 10/1963 | Beach et al.......................343/5 ST X |
| 3,383,677 | 5/1968 | Baum et al. .................343/112 CA X |

*Primary Examiner*—T. H. Tubbesing
*Attorney*—Kemon, Palmer & Estabrook

[57] ABSTRACT

A system according to the present invention for avoiding the collision of a moving body with other objects comprises a device for storing for a relatively long period of time information including approaching dangerous objects obtained by radar observation as well as information on the subject moving body.

16 Claims, 15 Drawing Figures

FIG. 1A

| | SUBJECT SHIP A | ANOTHER SHIP B |
|---|---|---|
| COURSE ANGLE | 0° | 150° |
| SPEED | 12 kt | 12 kt |

FIG. 9

INVENTOR.
Tomiji Nirasawa

FIG.2A

| | SUBJECT SHIP A | ANOTHER SHIP B |
|---|---|---|
| COURSE ANGLE | 45° | 150° |
| SPEED | 12 kt | 12 kt |

FIG.11

INVENTOR.
Tomiji Nirasawa

FIG. 2B

| | SUBJECT SHIP A | ANOTHER SHIP B |
|---|---|---|
| COURSE ANGLE | 45° | 150° |
| SPEED | 12kt | 12kt |

SYSTEM FOR AVOIDING THE COLLISION OF A MOVING BODY WITH OTHER OBJECTS

There are presented a first image picture corresponding to the present information and a second image picture corresponding to one or more data of the past information by reading out information stored in the memory device, thereby observing the relative positions of the subject moving body and other approaching dangerous objects through an image picture derived from composition of the first and second image pictures. When a collision between the subject moving body and any approaching dangerous objects is expected based on said observation, then there is formed a third simulating image picture by replacing that part of the second image picture representing the subject moving body with an image picture component based on suitable estimated information. A composite image picture is formed by superposing the third simulating image picture and first image picture on each other, thereby carrying out a trial operation to avoid an expected collision. As the result of the trial operation, such simulating trial operation is repeated using a number of similar data of estimated information at least until there is obtained optimum information which will eliminate the necessity of conducting any extra procedure, once there is actually executed a full-scale operation to avoid a collision. Since this operation is performed on the basis of said optimum information, collisions can be reliably prevented.

The present invention relates to a system for avoiding collisions adapted for use on moving bodies, for example, shipping or aircraft.

For convenience, there will now be described by reference to concrete examples the case where the moving body is a ship. To prevent collisions with other navigating ships, or stationary objects such as wharves or shoals for safety of voyage, a sea-faring ship is generally so equipped that it can keep on travelling while always watching for such objects coming into its vicinity of radar observation techniques and, where there is expected to be a collision from information obtained by radar observation, can suitably vary its course and/or speed.

Any of such systems installed in shipping to prevent collisions which have heretofore been put to practical use generally comprise observing by radar momentary changes in the relative positions to a subject ship of other ships or aforesaid stationary objects which are coming into the vicinity of the subject ship (hereinafter referred to as "approaching dangerous objects,") manually or automatically plotting such relative positions on a chart at a prescribed interval using radar information and, where there is anticipated a collision from the plotted data, immediately carrying out a collision-avoiding operation without performing any of the later-described trial operations according to the present invention conducted as preliminary procedure for avoidance of collisions. The possibility of the avoidance can not be judged until there is conducted further plotting after the collision-avoiding operation is undertaken.

Accordingly, the prior art collision-avoiding systems had the drawbacks that conclusion on the possibility of reliably effecting the avoidance of collisions could only be given a certain length of time after operation was actually taken for the avoidance, so that there often occurred the danger of the subject ship colliding with another new approaching dangerous object, thus requiring repetition of a similar collision-avoiding operation. Such repetition consumed much time, not only throwing the passengers of the subject ship into extreme anxiety but also, most likely leading to the occurrence of collision.

Use of the aforementioned plotted information for prevention of collisions generally has the drawback that where there is to be plotted the positions of approaching dangerous objects at a prescribed interval, increasing numbers of such objects complicate the plotting mechanism, thus naturally limiting the number of approaching objects to be watched for, whether plotting is performed manually or automatically.

The present invention has been accomplished in view of the aforementioned situation and is intended to provide a collision-avoiding system, which, in case there is anticipated a collision between a subject ship on voyage and any of approaching dangerous objects, does not immediately carry out a full-scale operation to avoid such collision, but tries simulating operations in advance using suitable forecast information which is supposed to enable the expected collision to be avoided at least until there are obtained such reliable data to assure the safest course and/or speed as will eliminate the necessity of carrying out any extra control operation, once a full-scale step is taken.

More concretely, the system of the present invention does not rely on manually plotted information as a means of watching for approaching dangerous objects, but uses a composite image picture obtained by mutually superposing a first image picture representing the present information on the subject ship and other objects including approaching dangerous objects and a second image picture corresponding to one or more data of stored information thereon. When there is expected to be a collision of the subject ship with any of the other approaching dangerous objects from such composite image picture, before there is taken any practical operation to avoid the expected collision, a simulating third image picture is formed by replacing that part of a second image picture representing the subject ship with a new picture component derived from estimated information on a new course to be taken by the subject ship and/or a new speed at which it is required to travel. Then there is performed a trial operation for avoidance of the expected collision using a composite image picture obtained by superposition of the first and third image pictures. Such trial operation, is repeated using a number of similar forecast data for avoidance of other expected collisions, at least until there is obtained the best or most desirable information to assure the safest course and/or speed as will eliminate the necessity of taking any extra procedure, once there is actually taken a full-scale operation to avoid all expected collisions. Accordingly, the system of the present invention is substantially unaffected by the number of approaching dangerous objects, but capable of unlimited watching for them against possible collisions therewith.

Another object of the present invention is to provide a more effective collision-avoiding system wherein, when the aforesaid composite image picture is formed, the first image component and second or third image component are made readily distinguishable by allowing them to assume different shades or sizes.

This invention can be more fully understood from the following detailed description when taken in connection with reference to the accompanying drawings, in which.

There will now be described by reference to the appended drawings the basic concept of a collision-avoiding system according to the present invention and its preferred embodiments.

For better understanding of the system of the present invention, its basic concept will be described first by reference to FIGS. 1A to 2B. For convenience of description, let it be assumed that within a field permitting radar observation as measured from a subject ship A on voyage there is noticed another travelling ship B which may be deemed as an approaching dangerous object. Further let it be supposed that where the ship B is indicated on a cathode ray tube 11 (hereinafter referred to as "CRT") as a plan position indication (hereinafter abbreviated as PPI) image associated with a system of indicating the true motions and true bearings of ships, there is obtained a PPI image illustrated in FIG. 1A. In this case, the course of the subject ship A (which is generally determined by signals representing the bow bearing derived from a gyrocompass or magnetic compass but in fact more or less varies from the bow bearing thus determined due to the effect of ocean current) is directed to the true north N and the other ship B approaches the ship A by a course displaced 150° clockwise from the true north N taken as 0°. The speeds of both ships A and B are fixed at 12 Knots. However, practically to discuss the possibility of both ships colliding with each other, it will be convenient to adopt a system of presenting the relative motions and true bearings of ships, where as is well known, shown in FIG. 1B the north N is set right at the top of the CRT 11 and the position of the subject ship A is fixed at the center thereof.

Now, the necessary and sufficient conditions for the collision of a given moving body R with another moving or stationary body S are that the relative distance of S as measured from R progressively decreases with time, but the relative bearings of S as measured from R remain constant with time.

As the subject ship A and another ship B meet the aforesaid conditions for collision and are expected to collide with each other after a cetain lapse of time (after about 20 minutes as shown), the course and/or speed of the subject ship A should be varied to avoid the anticipated collision. If, in such case, there is obtained an estimated information on the course and/or speed of the subject ship A, which is supposed to enable the expected collision to be avoided the system of the present invention does not immediately allow it to change either or both of them but carries out simulating trial operations, as later described, by furnishing estimated information on a proper course and/or speed for avoidance of a collision which the ship A is supposed to have taken in the past and enables the outcome of these trial operations to be determined at the present moment. If, soon after there is taken a full-scale control operation based on said simulating trial operations, there should arise a new danger of collision, then another cycle of these operations is conducted based on a separate estimated information associated with this happening. Thus it is not until there is obtained a final optimum information for avoidance of all the expected collisions that the subject ship A is actually allowed to vary its course and/or speed.

Figure 1A:
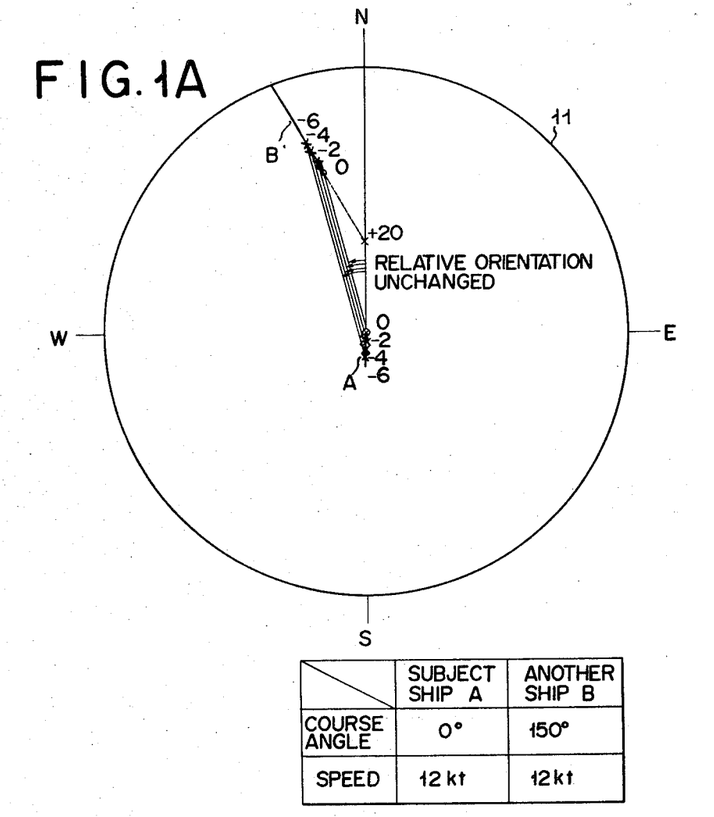
FIG. 1A illustrates a radar image obtained by a system which indicates the true motions and true bearings of objects.

There will now be described the manner in which there are carried out the aforementioned simulating trial operations by reference to an indication of the true motions and true bearings of ships shown in FIG. 1A and an indication of the relative motions and true bearings of ships given in FIG. 1B.

Figure 2A:
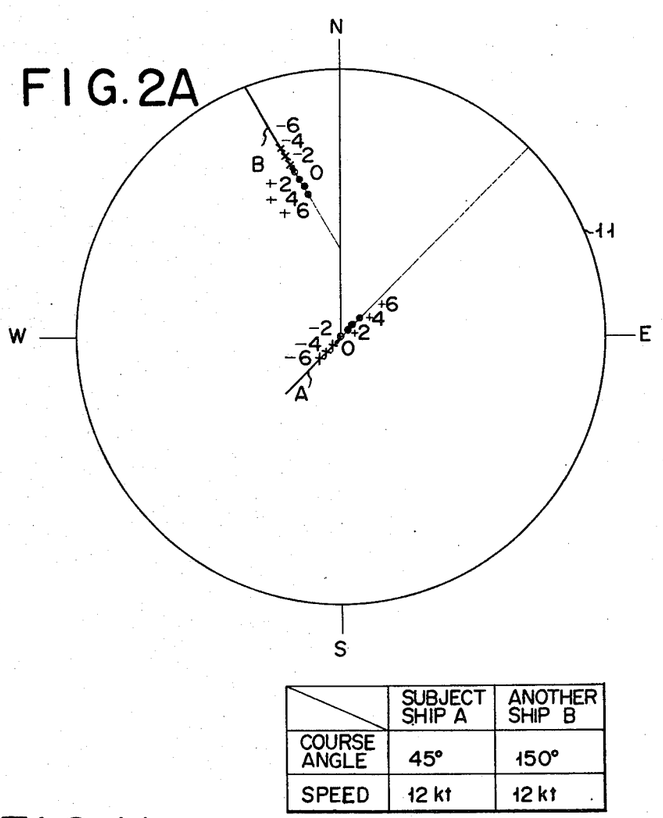
FIGS. 2A and 2B are simulating trial radar images for avoidance of expected collisions which explain the system of the present invention using indicating methods corresponding to those of FIGS. 1A and 1B.

Now let it be assumed that the subject ship A is expected to collide with another ship B after about 20 minutes and it is considered advisable for the subject ship A to deflect its course 45° clockwise (supposing, however, that the speed of the subject ship A and the course and speed of the other ship B remain unchanged). In such case, the system of the present invention does not instantly take a full-scale operation to cause the subject ship A to change its course, but preliminarily furnishes an estimated information with respect to its position at several points of time most approaching the present moment (referred to as the reference or base time and indicated by numeral 0, for example, 2, 4 and 6 minutes before said reference time designated as −2, −4 and −6 respectively). The system conducts a series of simulating trial operations in an attempt to find how the collision can be best avoided. FIG. 2A representing the true motions and true bearings of both ships A and B or FIG. 2B indicating their relative motions and true bearings are given for illustration of the system of the present invention.

Figures 2B, 12:
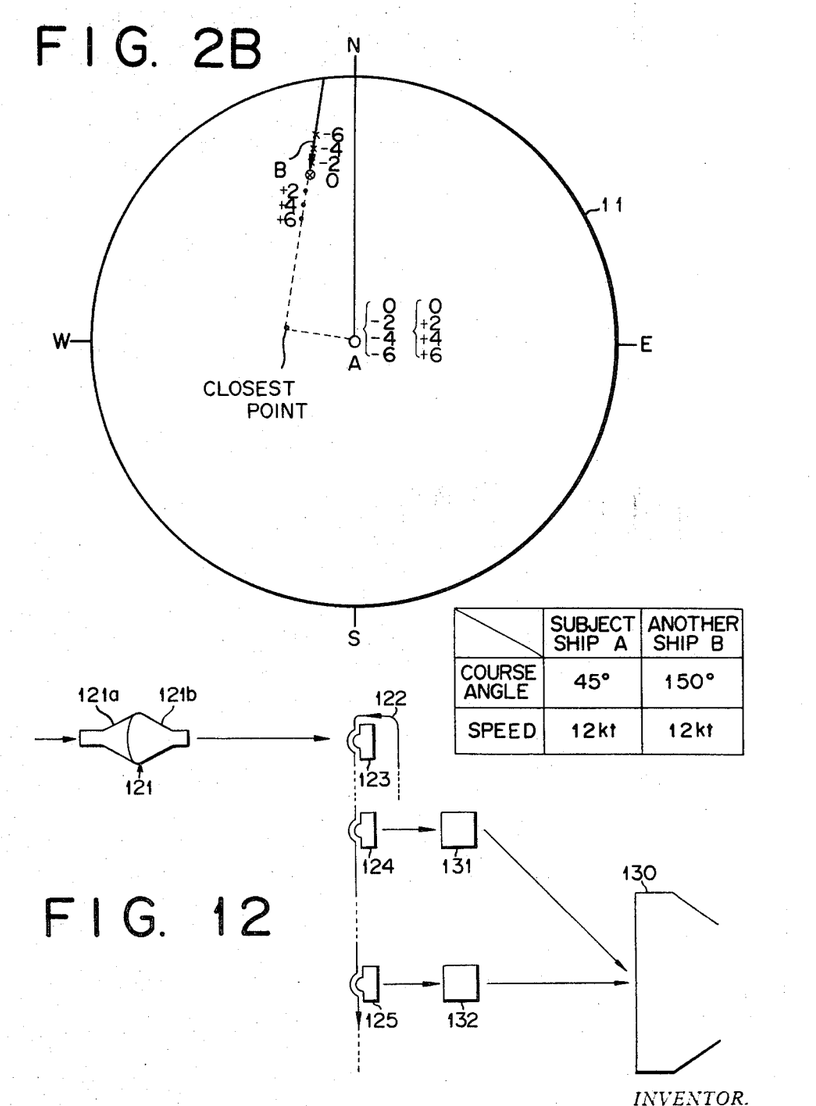

It is seen from FIG. 2B that if the subject ship A actually changes its course, then a collision between both ships A and B can be avoided, because after said change of course, the closest distance therebetween is about 3 miles and the time required for them to be brought to such positions takes about 21 minutes.

If, however, there is another approaching dangerous object in addition to said other ship B, the system of the present invention estimates the possibility of another collision at the same time, there are taken simulating trial operations with respect to the first mentioned danger and repeats another cycle of such simulating trial operations at least until there is obtained an optimum information which will serve to eliminate the danger of the latter collision. What calls for particular attention with regard to the system of the present invention is that the estimated information on the basis of which the system conducts simulating trial operations is not associated with the positions which the subject ship is expected to take in the future, but with the positions which it is supposed to have taken in the past so as to make the trial operation in connection with the actual past position of all the approaching dangerous objects. As apparent from FIGS. 2A and 2B, this procedure still gives substantially the equivalent results as when said estimated information is concerned with the future positions of the subject ship. The significance of this method will be more clearly understood from the description of the following embodiments.

There has been mentioned the case where the subject ship changes its course for avoidance of collisions. It will be apparent, however, that its speed or both its course and speed may be suitably changed.

Figure 3A:
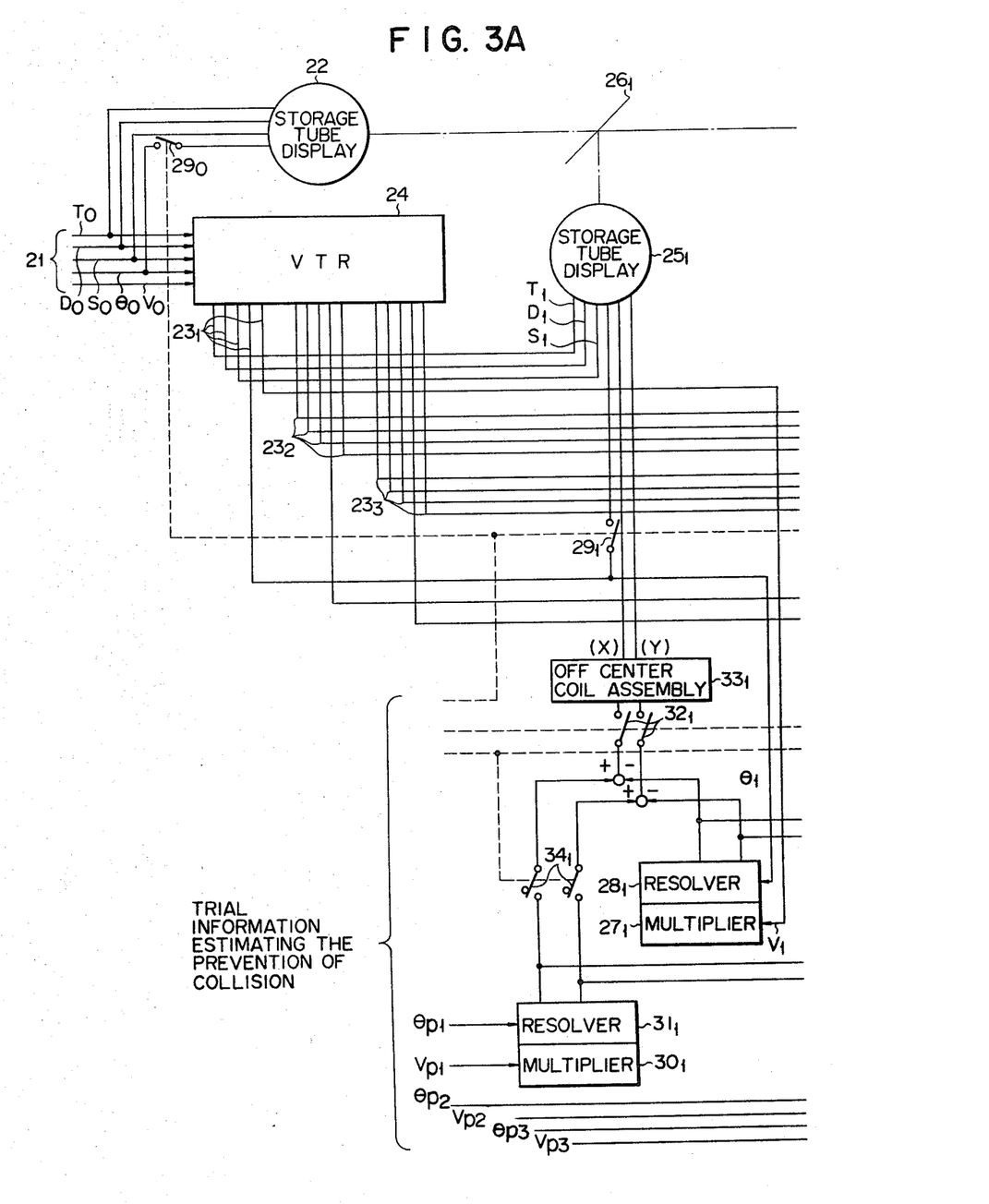
FIGS. 3a and 3b are a schematic block diagram of a collision-avoiding system for moving bodies according to an embodiment of the invention.
Figure 3B:
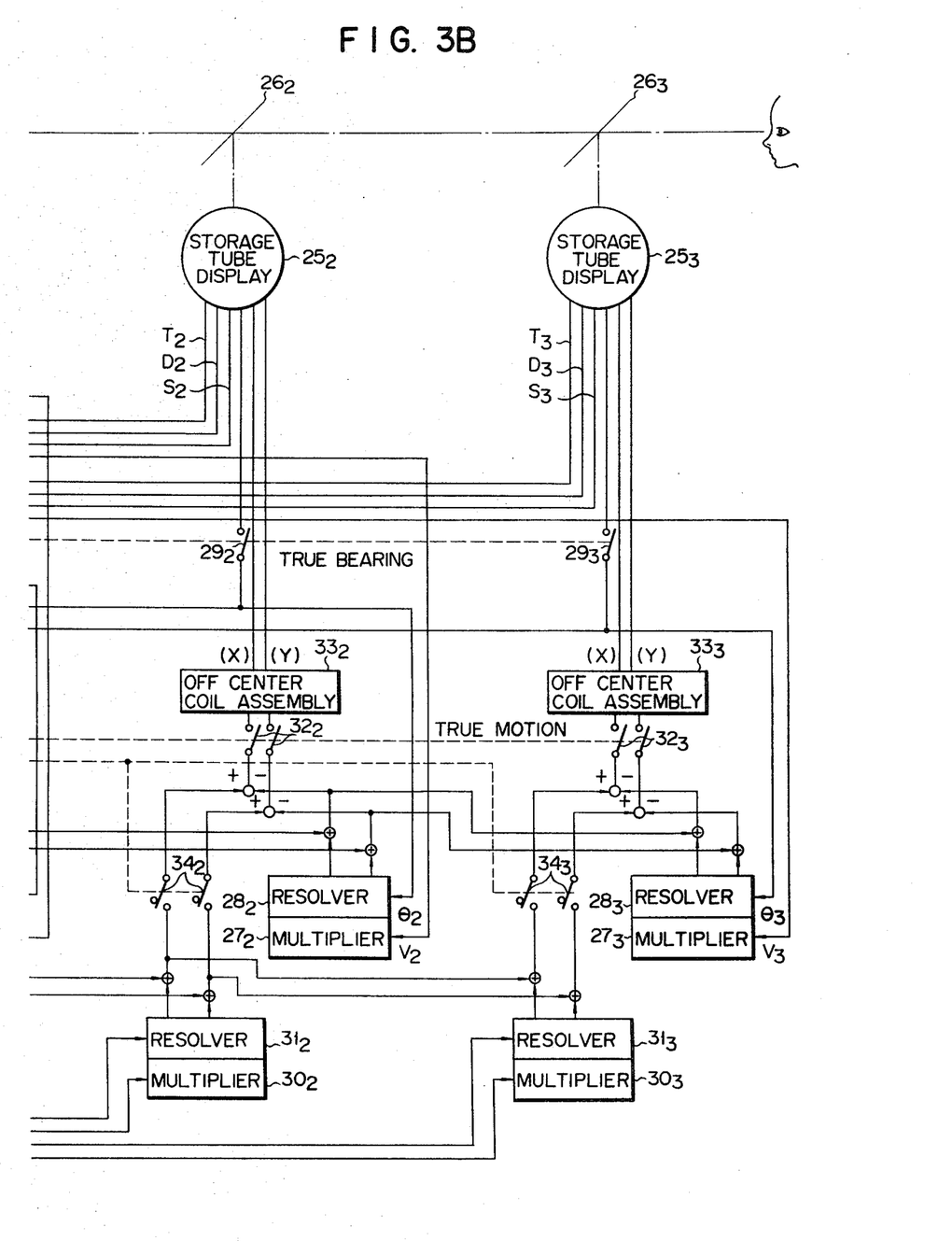

There will now be described by reference to FIGS. 3a to 12 the embodiments of the collision-avoiding system of the present invention based on the above-mentioned principle. FIGS. 3a and 3b show schematic circuit in block diagram form according to an embodiment of the invention. The terminal 21 is supplied with the undermentioned signals required to form the image picture of the subject ship and all other objects including approaching dangerous objects whose positions vary one moment after another, for example, on the PPI scope type CRT for radar observation. Namely with respect to the subject ship, the terminal 21 is supplied, for example, with signals $\theta_0$ representing the bow bearings generated by the gyrocompass or magnetic compass mounted thereon and signals $V_0$ from a speed signal generator, while, with regard to all other objects including approaching dangerous objects, the terminal 21 is supplied with video signals $D_0$ obtained by radar observation techniques associated with an ordinary system of indicating the relative motions and relative bearings of ships, synchronizing signals $S_0$ for rotation of a radar antenna and trigger signals $T_0$ to assure the synchronizing operation of the entire circuitry of FIGS. 3a and 3b.

The aforesaid various signals $\theta_0$ (only when the true bearing indication is used), $D_0$, $S_0$ and $T_0$ received by the terminal 21 are conducted to a first storage tube display 22 so as to continuously indicate on the screen thereof an image picture denoting the present relative positions of the subject ship and all other objects including approaching dangerous objects which vary one moment after another. In this case, as is well known per se, the video signals $D_0$ are supplied to the cathode or first grid electrode of the storage tube display 22 and the trigger signals $T_0$ to a sweep circuit thereof, and then the triggered sweep signals are supplied to the deflection coil assembly. The synchronizing signals $S_0$ are supplied to the rotating means for the deflection coil assembly of the tube display 22 and the bow bearing signals $\theta_0$ at the indication of the true bearing to the aforesaid rotating means through the later described switch $29_0$ in the form of a sum with the synchronizing signals $S_0$, or a balance therebetween. Also all the aforesaid signals $\theta_0$, $V_0$, $D_0$, $S_0$ and $T_0$ are supplied to a video tape recorder (hereinafter referred to as "VTR") 24 to be temporarily stored therein which is provided with terminals $23_1$, $23_2$ and $23_3$ for reading out signals recorded therein at one or more points of past time, for example, 2, 4 and 6 minutes before the present time. The signals $\theta_0$, $V_0$, $D_0$, $S_0$ and $T_0$ temporarily stored in the respective VTR 24 are read out through the terminals $23_1$, $23_2$ and $23_3$, and then the other signals $D_0$, $S_0$ and $T_0$ and the signals $\theta_0$ and $V_0$ are directly supplied to second, third and fourth storage tube displays $25_1$, $25_2$ and $25_3$ of the same construction as the first storage tube display 22 which are so disposed as to correspond to the aforesaid terminal $23_1$, $23_2$ and $23_3$. On the respective screens of the second, third and fourth storage tube displays $25_1$, $25_2$ and $25_3$ are continuously displayed image pictures denoting the relative positions of the subject ship and all other objects including approaching dangerous objects 2, 4 and 6 minutes before the present time respectively. Generally, three sets of composite pictures derived from superposition of the picture on the first storage tube display 22 and that on the second storage tube display $25_1$, that on the third storage tube display $25_2$ and that on the fourth storage tube display $25_3$ are observed through the corresponding first, second and third translucent mirrors $26_1$, $26_2$ and $26_3$. Where there is anticipated during said observation the danger of the subject ship colliding with one of the approaching dangerous objects, the system of the present invention does not immediately cause the subject ship to vary its course and/or speed for avoidance of said expected collision, but carries out observation by a composite picture prepared by superposition of the picture, the first storage tube display 22 representing the subject ship and new pictures obtained by replacing the picture components associated with the subject ship of the similar pictures on the second, third and fourth storage tube displays $25_1$, $25_2$ and $25_3$ with picture components based on a simulating estimated information which is deemed suitable for avoidance of the collision. This observation is continued on the basis of a series of information which are considered adequate from time to time until there is finally obtained an optimum information which is concluded to eliminate the anticipated occurrence of not only the first mentioned danger but also any others. Further, the system of the present invention is designed, as described below, to employ, if required, a system of indicating the true motions and true bearings or relative motions and true bearings of ships in addition to the aforesaid system of indicating the relative motions and relative bearings thereof in indicating the respective images on the screens of the first, second, third and fourth storage tube displays 22, $25_1$, $25_2$ and $25_3$.

Among the respective various signals sent from the read-out terminals $23_1$, $23_2$ and $23_3$ of the VTR 24, the signals $v_1$, $v_2$ and $v_3$ denoting the speeds of the subject ship at points of time 2, 4 and 6 minutes respectively before the present time are supplied to the corresponding multipliers $27_1$, $27_2$ and $27_3$ of the undermentioned arrangement. Also the signals $\theta_1$, $\theta_2$ and $\theta_3$ representing the bow bearings of the subject ship at the aforesaid points of time are supplied to the corresponding resolvers $28_1$, $28_2$ and $28_3$ of the later described arrangement which are cascade connected to the multipliers $27_1$, $27_2$ and $27_3$ respectively and then to the corresponding second, third and fourth storage tube displays $25_1$, $25_2$ and $25_3$ through switches $29_1$, $29_2$ and $29_3$ respectively which are closed only when the true bearing indication is used. In this case, only the signal $\theta_0$ denoting the bow bearing of the subject ship involved in the aforesaid various signals received by the aforesaid terminal 21 is conducted to the first storage tube display 22 through the aforesaid switch $29_0$ which is closed in interlocking relationship with the above-mentioned switches $29_1$, $29_2$ and $29_3$. Further, for the second, third and fourth storage tube displays $25_1$, $25_2$ and $25_3$ other multipliers $30_1$, $30_2$ and $30_3$ are provided of the same arrangement as the aforementioned multipliers $27_1$, $27_2$ and $27_3$ and other resolvers $31_1$, $31_2$ and $31_3$ of the same arrangement as the aforementioned resolvers $28_1$, $28_2$, and $28_3$ and cascade connected to said other multipliers $30_1$, $30_2$ and $30_3$.

Said other multipliers $30_1$, $30_2$ and $30_3$ selectively receive signals $v_{p1}$, $v_{p2}$ and $v_{p3}$ supplied from the subject ship in the undermentioned form which denote a proper estimated speed at which it is desired to travel. On the other hand, said other resolvers $31_1$, $31_2$ and $31_3$ selectively receive signals $\theta_{p1}$, $\theta_{p2}$ and $\theta_{p3}$ supplied from the subject ship in the undermentioned form which represent a proper estimated bow bearing. The respective output terminals of the resolvers $28_1$, $28_2$ and $28_3$ provided with respect to signals from the VTR 24 are connected to the aforesaid deflection coil rotating means of the second, third and fourth storage tube displays $25_1$, $25_2$ and $25_3$ through the corresponding switches $32_1$, $32_2$ and $32_3$ closed upon the indication of the true motion of the subject ship or upon trial operation according to the invention and off center coil assemblies $33_1$, $33_2$ and $33_3$. On the respective other hand, the output terminals of the resolvers $31_1$, $31_2$ and $31_3$ provided with respect to signals denoting the aforesaid estimated information on the speed and bow bearing of the subject ship are connected to the corresponding aforesaid switches $32_1$, $32_2$ and $32_3$ through the interlocking switches $34_1$, $34_2$ and $34_3$ respectively which are closed upon the impression of the aforesaid estimated speed and/or bow bearing signals. Signals from the resolvers $28_1$ and $31_1$ are respectively added to those from the resolvers $28_2$ and $31_2$ and signals from the resolvers $28_2$ and $31_2$ resulting from said addition are further added to those from the resolvers $28_3$ and $31_3$.

Figure 4:
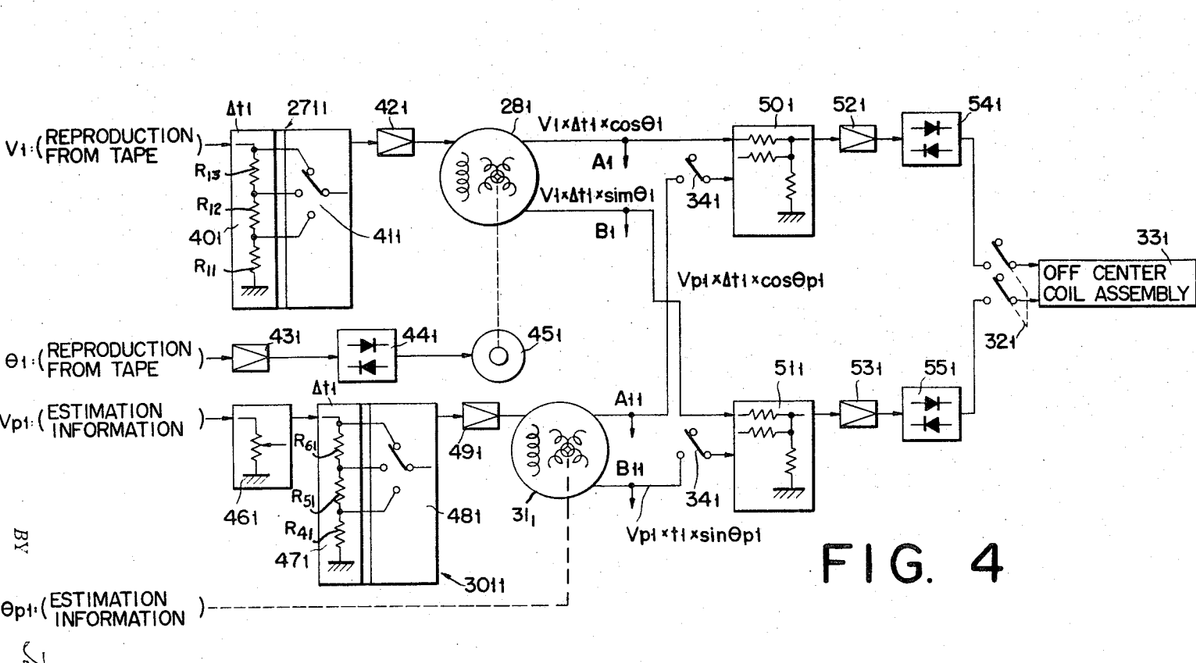
FIG. 4 is a circuit arrangement of the multipliers and resolvers corresponding to the second storage tube display of FIG. 3.

FIG. 4 represents a circuit arrangement of the multipliers $27_1$ and $30_1$ and resolvers $28_1$ and $31_1$ corresponding to the second storage tube display $25_1$ of FIGS. 3a and 3b. A signal $v_1$ representing the speed of the subject ship (the same applies to the signals $v_2$ and $v_3$) constitutes a carrier signal of 400 Hz adapted to be recorded, for example, in the VTR 24 and is transmitted in the form of an amplitude modulated wave obtained by varying the amplitude of said 400 Hz signal according to the magnitude of the speed of the subject ship. On the other hand, a signal $\theta_1$ denoting the bow bearing of the subject ship (the same applies to the signals $\theta_2$ and $\theta_3$) is transmitted in the form of a pulse modulated wave having a positive or negative polarity in order that there may be detected one pulse each time the bow bearing is deflected, for example 0.1°, thereby distinguishing its displacement to the right from that to the left.

Further, a signal $v_{p1}$ indicating an estimated information on the speed of the subject ship (the same applies to $v_{p2}$ and $v_{p3}$) assumes the form of a 400 Hz signal whose amplitude varies with the magnitude of its speed to be newly set, as is the case with the aforesaid signals $v_1$, $v_2$ and $v_3$ reproduced from the VTR 24 which represent its actual speed. A signal $\theta_{p1}$ denoting an estimated information on the bow bearing of the subject ship (the same applies to $\theta_{p2}$ and $\theta_{p3}$) is given forth in the form of a pulse signal having the same positive or negative polarity as that which is imparted to the signals indicating the bow bearing of the subject ship when they are recorded in the VTR 24. Said signal $v_1$ denoting the actual speed of the subject ship which was reproduced from the VTR 24 and transmitted in the form of an amplitude modulated wave of 400 Hz is supplied to one end of a multiplier consisting of a resistor circuit network $271_1$, the other end of which is grounded, and its output therefrom assumes a voltage proportionate to its amplitude.

Now, the distance through which the subject ship has travelled should be determined for accuracy by integrating its momentary speed by time $t$ required for it to cover said distance $d$, namely, by an equation $d = \delta v \cdot dt$. However, where the distance is considered with respect to a given short length of time, the speed $v$ may be deemed to have a fixed value. This is rather favorable from the practical point of view. Based on this concept, therefore, the value of the voltage derived from the aforesaid resistor circuit network $271_1$ may be considered to indicate the distance $d_1 = v_1 \cdot t_1$ which the subject ship travelled in the past 2 minutes. If the resistor circuit network $271_1$ is formed, for example, of a circuit $40_1$ comprising three serially connected resistors $R_{11}$, $R_{12}$ and $R_{13}$ shown in FIG. 4, then changeover of the terminals of these resistors by shifting down the position of a switch $41_1$ enables the above indicated $\Delta t_1$ to be set at other points of time, for example, 1 minute and 30 seconds before the present moment than the aforementioned past 2 minutes. Thus it is possible freely to select any division of the time consumed in the past travel of the subject ship, that is, its past position in displaying the image on the screen of the corresponding second storage tube display $25_1$ (the same applies to the third and fourth storage tube displays $25_2$ and $25_3$). In this case, however, it is necessary to provide a similar switching device with respect to an actual information on approaching dangerous objects obtained by radar observation which appears on the second, third and fourth storage tube displays $25_1$, $25_2$ and $25_3$. To this end, it will be apparent that the aforesaid switching device may be replaced by the step of rendering the speed variable at which there are recorded signals in the VTR 24 or reproduced therefrom, or variably controlling the positions of the read-out terminals $23_1$, $23_2$ and $23_3$. The signal component $v_1 \cdot \Delta t_1$ indicating the travelling distance of the subject ship which is obtained through the resistor circuit network $271_1$ is supplied to the resolver $28_1$ after being properly amplified by an amplifier $42_1$. On the other hand, the signal $\theta_1$ denoting the bow bearing of the subject ship which is reproduced from the VTR 24 and supplied in the form of the aforesaid pulse modulated wave is properly amplified by an amplifier $43_1$ to have it pulse component detected by a bilateral rectifying circuit $44_1$. The pulse component thus detected is supplied to a pulse motor $45_1$ capable of rotating in a normal and reverse direction. The rotating torque of the pulse motor $45_1$ is transmitted to the resolver $28_1$. Accordingly, from the two output terminals $A_1$ and $B_1$ of the resolver $28_1$ is obtained the signal component $v_1 \cdot \Delta t_1$ indicating the travelling distance of the subject ship which is derived from the multiplier $271_1$, said signal component being further resolved, as is well known, into a horizontal component $-v_1 \cdot \Delta t_1 \cdot \cos\theta_1$ and a vertical component $-v_1 \cdot \Delta t_1 \cdot \sin\theta_1$.

The signal $v_{p1}$ of 400 Hz supplied from the aforesaid source of estimated information whose amplitude varies with the magnitude of the set speed of the subject ship has its voltage level suitably set by a variable resistor $46_1$ and is supplied to the resolver $31_1$ in the form of a signal $v_{p1} \cdot \Delta t_1$ denoting the estimated travelling distance of the subject ship through a multiplier $301_1$ which consists of a resistor circuit network $47_1$ involving three serially connected resistors $R_{41}$, $R_{51}$ and $R_{61}$ similar to the circuit network $40_1$ and a switch $48_1$ similar to the switch $41_1$ as well as through an amplifier $49_1$. On the other hand, the signal $\theta_{p1}$ indicating the bow bearing which is supplied from the aforesaid source of estimated information and formed of a pulse signal generating one pulse each time the bow bearing of the subject ship is deflected 0.1° and having a positive or negative polarity which is determined according as said bow bearing is displaced to the right or left, is directly supplied to the resolver $31_1$. As a result, from the two output terminals $A_{11}$ and $B_{11}$ a signal component $v_{p1} \cdot \Delta t_1$ is obtained indicating the estimated travelling distance of the subject ship which is derived from the multiplier $301_1$, said signal component being further resolved into a horizontal component $v_{p1} \cdot \Delta t_1 \cdot \cos\theta_{p1}$ and a vertical component $v_{p1} \cdot \Delta t_1 \cdot \sin\theta_{p1}$. Among the two groups of output terminals each comprising $A_1 - B_1$ and $A_{11} - B_{11}$ associated with the two resolvers $28_1$ and $31_1$, the corresponding output terminals $A_1 - A_{11}$ and $B_1 - B_{11}$ are connected to summing circuits $50_1$ and $51_1$ respectively. In this case, however, the output terminals $A_1$ and $B_1$ of the resolver $28_1$ provided with respect to signals from the VTR 24 are directly connected, as seen from FIG. 4, to the corresponding input terminals of the summing circuits $50_1$ and $51_1$. On the other hand, the output terminals $A_{11}$ and $B_{11}$ of the resolver $31_1$ provided with respect to signals from the aforesaid source of estimated information are connected to the input terminals of the summing circuits $50_1$ and $51_1$ through the switch $34_1$.

Output signals from both summing circuits $50_1$ and $51_1$ are properly amplified by amplifiers $52_1$ and $53_1$ and supplied to bilateral rectifying circuits $54_1$ and $55_1$ to eliminate the AC components of signals from the resolvers $28_1$ and $31_1$, thereby only detecting the desired D.C. signal components consisting of a horizontal and a vertical component. The DC signal components are supplied to the off center coil assembly $33_1$ through the aforementioned switch $32_1$.

Figure 5:
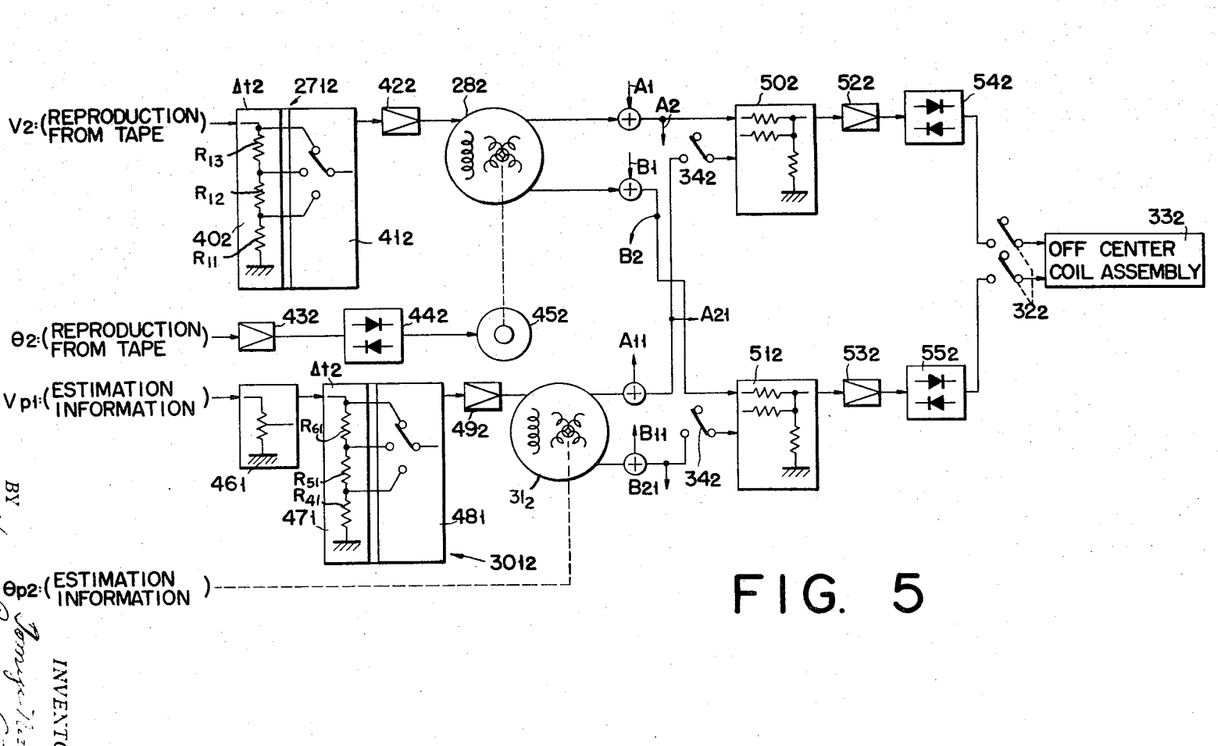
FIG. 5 is a circuit arrangement of the multipliers and resolvers corresponding to the third storage tube display of FIG. 3.

FIG. 5 represents a circuit arrangement of the multipliers $27_2$ and $30_2$ and resolvers $28_2$ and $31_2$ corresponding to the third storage tube display $25_2$. To the two output signals $A_2$ and $B_2$ of the resolver $28_2$ with respect to signals from the VTR 24 are added output signals from the two output terminals $A_1$ and $B_1$ of the corresponding resolver $28_1$ of FIG. 4. To the output terminals $A_{21}$ and $B_{21}$ of the resolver $31_2$ with respect to signals from the aforesaid source of estimated information are added output signals from the two output terminals $A_{11}$ and $B_{11}$ of the corresponding resolver $31_1$ of FIG. 4. Except for such arrangement, the embodiment of FIG. 5 is exactly the same as that of FIG. 4. Accordingly, the parts of FIG. 5 corresponding those of FIG. 4 are denoted by the corresponding numerals and description thereof is omitted.

To understand the function of the multipliers $27_3$ and $30_3$ and resolvers $28_3$ and $31_3$ corresponding to the forth storage tube display $25_3$, it will be sufficient, as seen from FIGS. 3a and 3b, to apply the relationship of FIGS. 4 and 5 to said multipliers and resolvers, so that description and drawings thereof are omitted.

There will now be described the operation of a collision-avoiding system arranged as described above according to the present invention. Generally, the momentarily varying relative positions of approaching dangerous objects with respect to a subject are observed by means of three composite images appearing on the aforementioned translucent mirrors $26_1$, $26_2$ and $26_3$. If, in this case, the two groups of interlocking switches $29_0 - 29_3$ and $32_1 - 32_3$ are left open as shown in FIGS. 3a and 3b, signals denoting the speed and bow bearing of the subject ship are not supplied to the first, second, third and fourth storage tube displays 22, $25_1$, $25_2$ and $25_3$, so that these storage tube displays only present the images of all other objects including approaching dangerous objects obtained by radar observations, indicating their relative motions and bearings with respect to the subject ship. With this form of indication, the position of the subject ship is always set at the center of the scope, making it practically unnecessary to present its image picture. When the switches $29_0$ to $29_3$ are closed, signals $\theta_0$ to $\theta_3$ denoting the momentarily varying bow bearing of the subject ship are supplied to the corresponding first, second, third and fourth storage tube displays 22, $25_1$, $25_2$ and $25_3$, so that the images appearing on the screens of these storage tube displays indicate the relative motion and true bearing of the subject ship. In this case, the first storage tube display 22 always presents the image of the subject ship at the present moment, so that it is obviously unnecessary to supply said tube display with signals indicating the speed of the subject ship.

Where both groups of switches $29_0$ to $29_3$ and $32_1$ to $32_3$ are closed, then the first storage tube display 22 is supplied with a signal $\theta_0$ denoting the bow bearing of the subject ship, and the second, third and fourth storage tube displays $25_1$, $25_2$ and $25_3$ are supplied with the corresponding signals $\theta_1$, $\theta_2$ and $\theta_3$ indicating the bow bearing of the subject ship and also the corresponding signals $v_1$, $v_2$ and $v_3$ denoting its speed, so that the images displayed on the first, second, third and fourth storage tube displays 22, $25_1$, $25_2$ and $25_3$ obviously exhibit the true motion and true bearing of the subject ship.

Signals supplied from the resolvers $28_1$, $28_2$ and $28_3$ to the corresponding off center coil assemblies $33_1$, $33_2$ and $33_3$ are resolved, as seen from FIGS. 4 and 5, into horizontal components $-v_1 \cdot \Delta t_1 \cdot \cos\theta_1$ to $-v_3 \cdot \Delta t_1 \cdot \cos\theta_3$ and vertical components $-v_1 \cdot \Delta t_1 \cdot \sin\theta_1$ to $-v_3 \cdot \Delta t_1 \cdot \sin\theta_3$.

Where the collision of the subject ship with any of the approaching dangerous objects is anticipated during observation of the three images formed on the three translucent mirrors $26_1$, $26_2$ and $26_3$, then the switches $34_1$, $34_2$ and $34_3$ are closed and the switches $32_1$ to $32_3$ and $29_0$ to $29_3$ are also closed so as to cause the images on the first, second, third and fourth storage tube displays 22, $25_1$, $25_2$ and $25_3$ to indicate the relative motion and true bearing of the subject ship most adapted to estimate the possibility of avoiding its collision with other approaching objects. Thereafter the multipliers $30_1$, $30_2$ and $30_3$ and resolvers $31_1$, $31_2$ and $31_3$ are supplied with signals $v_{p1}$, $v_{p2}$ and $v_{p3}$ denoting the estimated speed of the subject ship and signals $\theta_{p1}$, $\theta_{p2}$ and $\theta_{p3}$ indicating its estimated bow bearing which are deemed suitable for prevention of its collision. Then as apparent from FIGS. 4 and 5, the off center coil assemblies are supplied with horizontal components $v_{p1} \cdot \Delta t_1 \cdot \cos\theta_{p1} - v_1 \cdot \Delta t_1 \cdot \cos\theta_1$ to $v_{p3} \cdot \Delta t_1 \cdot \cos\theta_{p3} - v_3 \cdot \Delta t_1 \cdot \cos\theta_3$ and vertical components $v_{p1} \cdot \Delta t_1 \cdot \sin\theta_{p1} - v_1 \cdot \Delta t_1 \cdot \sin\theta_1$ to $v_{p3} \cdot \Delta t_1 \cdot \sin\theta_{p3} - v_3 \cdot \Delta t_1 \cdot \sin\theta_3$ corresponding to a relative vector sum of the horizontal components and vertical components derived from the signals $v_1$ to $v_3$ indicating the actual speed of the subject ship and the signals $\theta_1$ to $\theta_3$ representing its actual bow bearing and the corresponding horizontal and vertical components which are freshly formed from the estimated information. As a result, those parts of the image pictures representing the subject ship which appear on the second, third and fourth storage tube displays $25_1$, $25_2$ and $25_3$ provided to denote its positions 2, 4 and 6 minutes before the present moment are replaced with simulating image pictures which are formed on the assumption that the subject ship lies at the positions corresponding to the aforesaid relative vector sum instead of the positions at which it was actually located at the aforesaid points of past time. Then there are observed through the translucent mirrors $26_1$, $26_2$ and $26_3$ the composite images obtained by superposition of the image on the first storage tube display 22 indicating the position of the subject ship at the present moment and the images on the second, third and fourth storage tube displays $25_1$, $25_2$ and $25_3$ prepared by replacing the image components representing the actual positions of the subject ship at said points of past time with the aforesaid simulating image components based on the estimated information. Thus determination is made based on said observation as to the suitability of the simulating trial operation to change the course of the subject ship using the aforesaid estimated information before a full-scale operation to effect the change of course is actually taken. If, during said determination, the danger of collision between the subject ship and a different approaching dangerous object should arise with respect to the simulating course thus temporarily set, then a similar simulating course-changing operation is repeated based on a freshly supplied estimated information, until there is finally obtained an optimum information to assure the safest course for avoidance of all anticipated collisions. Based on said optimum information on the estimated course, a full-scale operation to change the course of the subject ship is actually carried out.

According to the foregoing embodiments, three composite images were prepared representing the positions of the subject ship by superposition of such image at the present moment and those at various points of past time, in order to observe the relative positions of the subject ship and approaching dangerous objects and conduct simulating trial operations to change the course of the subject ship for avoidance of its anticipated collision. It will be apparent, however, that to this end, it will be sufficient to obtain simulating trial images denoting the positions of the subject ship at more than one point of past time and the number of said points may be freely selected. Further, the signals $v_{p1}$, $v_{p2}$ and $v_{p3}$ representing the estimated speed of the subject ship and the signals $\theta_{p1}$, $\theta_{p2}$ and $\theta_{p3}$ denoting its estimated bow bearing formed to carry out simulating trial operations for the change of its course were set at different values. In practical application, however, it will be more desirable for simplification of operation to allow the two groups of signals to have an equal value respectively, that is $$v_{p1} = v_{p2} = v_{p3} \text{ and } \theta_{p1} = \theta_{p2} = \theta_{p3}.$$

A pickup tube for displaying the aforesaid radar image (the equivalents of which are the first, second, third and fourth storage tube displays 22, $25_1$, $25_2$ and $25_3$ involved in the embodiment of FIGS. 3a and 3b) heretofore generally consisted of a residual photoimage-forming CRT. However, this type of CRT generally caused that part of the image representing a foreground object lying just behind the scanning line which moved according to the rotation of a radar antenna to be indicated in relatively high intensity, but the other parts of the image denoting objects located further removed from such point to gradually decrease in intensity until the image sections indicating objects disposed right ahead of the scanning line were presented dark in lowest intensity. Since the image derived from the aforesaid type of CRT displayed a dark picture as a whole, there was generally required a hood for shutting off external light thereby to facilitate the observation of said image. Moreover, the conventional CRT had the drawback that an image appearing on a single screen involved light and dark shades, calling for a considerable degree of skill to effect accurate observation.

Figures 6, 7, 8:
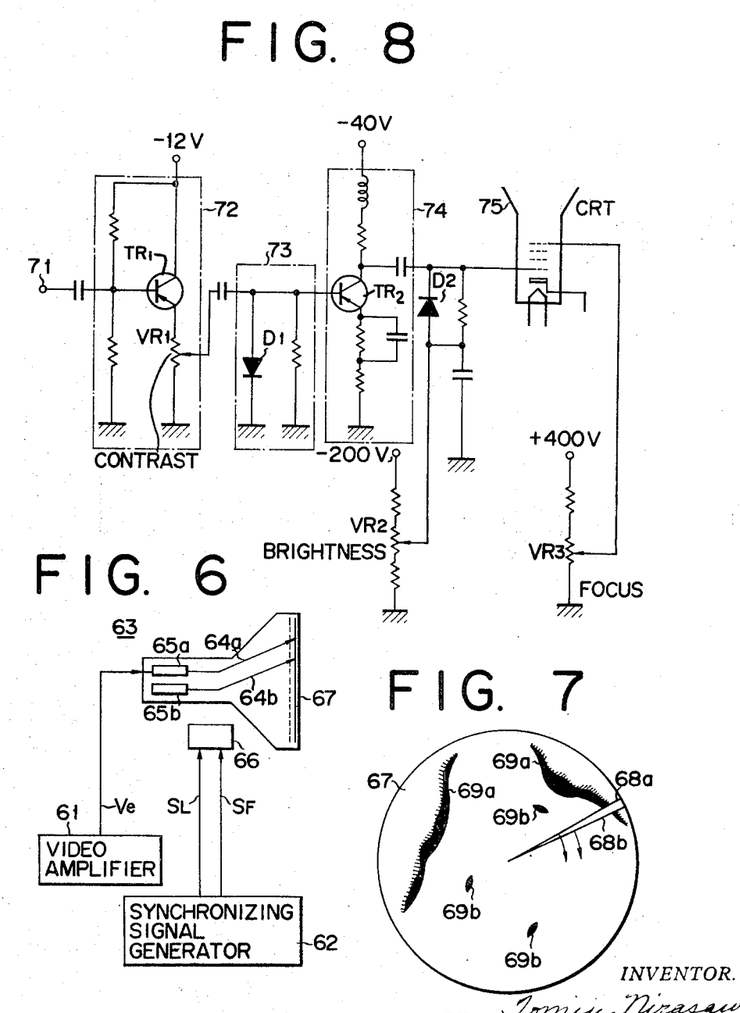
FIG. 6 is a schematic circuit arrangement of the storage tube assembly of the invention adapted for use as the first to fourth storage tubes.
FIG. 7 is an image on any of the storage tubes of FIG. 6.
FIG. 8 is a circuit arrangement of the main part of means adapted to distinguish the radar images from each other according to the invention.

Accordingly, the inventors have developed as a result of research and experiments a directly visible storage tube illustrated in FIGS. 6 and 7 which enables an image displayed on a single screen to exhibit relatively high intensity and substantially homogeneous picture elements.

Referring to FIG. 6, numeral 61 is a video amplifier for amplifying video signals $V_e$ obtained by the aforesaid radar observation. 62 represents a synchronizing signal generator for generating signals $S_F$ synchronizing with the rotating period of a radar antenna and signals $S_L$ synchronizing with the period in which there are repeated radar transmission pulses. 63 denotes the body of a visible storage tube comprising an electron gun 65a for generating write-in electron beams 64a and an electron gun 65b for generating electron beams 64b for extinction thereof. The write-in electron gun 65a is supplied with video signals $V_e$ from the video amplifier 61 so as to modulate the density of output write-in electron beams from said electron gun 65a. Scanning is conducted by impinging electron beams on a screen 67 from both electron guns 65a and 65b, using a mechanism 66 for accelerating, focussing and deflecting electron beams under control of the aforesaid both types of synchronizing signals $S_F$ and $S_L$ generated by the synchronizing signal generator 62. In this case, electron beams 64b from the extinguishing electron gun 65b are so set as to slightly precede electron gun beams 64a from the write-in electron gun 65a to the rotating direction of the scanning lines.

With the directly visible storage tube arranged as described above, the images previously stored in the screen 67 of the tube body 63 are extinguished in turn by a scanning line 68b formed by preceding extinguishing electron beams 64b. Immediately after said extinction, there are stored desired images based on video signals $V_e$ obtained through the video amplifier 61 by a scanning line 68a consisting of write-in electron beams 64a. Numerals 69a and 69b of FIG. 7 denote images obtained when the video signals contain components corresponding to land and other ships lying around the subject ship.

The visible storage tube of the present invention arranged as described above enables an image presented on the screen thereof to display relatively high intensity and homogeneous picture elements all over the screen so long as it is not effaced by an extinguishing scanning line 68b. Accordingly, said tube obviously permits far easier observation than has heretofore been possible without the necessity of using a hood as is the case with the prior art storage tube.

As mentioned above, where composite images appearing on a plurality of storage tubes are observed, distinction between the composite image components representing the subject ship so as to define the associated storage tubes enables observation to be performed more reliably and easily.

For the purpose of the present invention, therefore, it is preferred that means for previously distinguishing between images presented on the first, second, third and fourth storage tube displays 22, $25_1$, $25_2$ and $25_3$ be constructed as follows.

Generally, the cRT circuit arrangement is additionally provided with means for adjusting the contrast, brightness and focus of images formed on a screen.

FIG. 8 represents a schematic arrangement of the main part of the transistor circuitry of a CRT used for the aforesaid purpose. The terminal 71 is supplied with video signals detected by a preceding video discriminator (not shown). Video signals from the terminal 71 are supplied to an emitter grounded transistor circuit 74 having a transistor $TR_2$ and generating image signals through an emitter follower transistor circuit 72 having a transistor $TR_1$ and a variable resistor $VR_1$ for adjustment of contrast connected between the emitter terminal of said transistor $TR_1$ and ground and a DC component reproducing circuit 73 using a diode $D_1$ of the indicated polarity. Image signals from the circuit 74 are supplied to the control grid (or cathode) of a CRT 75, and also to a variable resistor $VR_2$ for adjustment of brightness through a diode $D_2$ of the indicated polarity. The fourth grid of the aforesaid CRT 75 is connected to a variable resistor $VR_3$ for adjustment of focus. For the purpose of the present invention, therefore, it is desired that adjustment by one or more of the aforesaid three variable resistors $VR_1$, $VR_2$ and/or $VR_3$ be performed at different points of the first, second, third and fourth storage tube displays 22, $25_1$, $25_2$ and $25_3$. Where the composite images appearing on the translucent mirrors $26_1$, $26_2$ and $26_3$ are monitored, the aforesaid arrangement offers great convenience in defining what storage tube is associated with the image presented on any of the mirrors.

Figures 1B, 10:
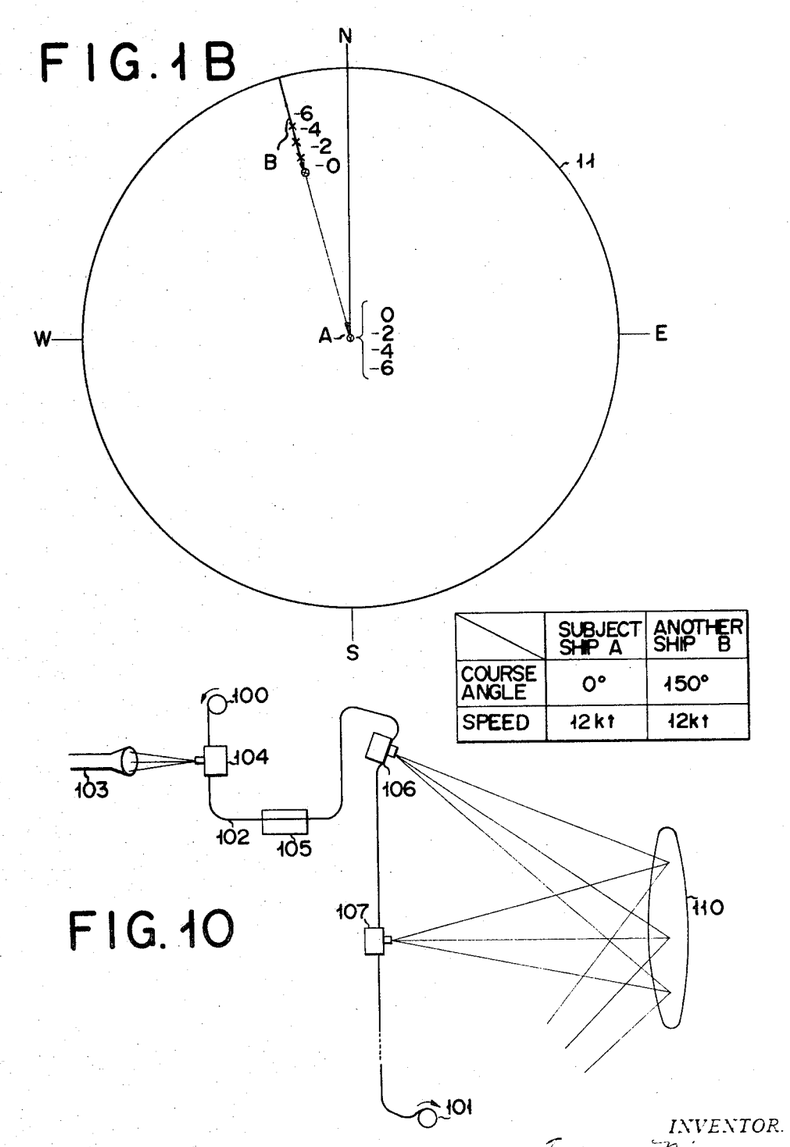
FIG. 1B represents a radar image in which the indicating system of FIG. 1A is changed to one showing the relative motions and true bearings of objects.
FIGS. 9 to 12 schematically illustrate the arrangement of composite image-forming mechanisms according to other embodiments of the invention adapted to replace that of the embodiment of FIG. 3.
Figure 9:
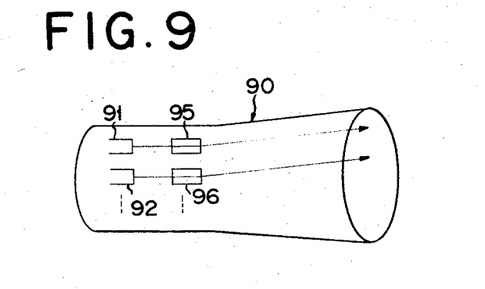

FIGS. 9 to 12 illustrate other embodiments of the present invention adapted to be used as means for forming the aforementioned composite image. FIG. 9 relates to the case where a multigun CRT 90 is used comprising a plurality of electron guns 91, 92 ... and deflectors 95, 96 ... FIGS. 3A and 3B refer to the case where the images on the screens of the separate storage tube displays 22, $25_1$ to $25_3$ were photosynthesized through the translucent mirrors $26_1$ to $26_3$. However, from the standpoint of, for example, saving space, it is possible to use a multi-gun CRT 90 of FIG. 9 having a common display surface. This multi-gun CRT 90 may be deemed to have the same function as that performed jointly by a plurality of storage tube displays excepting that it has a common display surface. Referring to FIG. 10, a photo film 102 is stretched across a feed reel 100 and takeup reel 101. The film 102 is made to travel from the feed reel 100 to the takeup reel 101. Adjacent to the feed reel 100 is disposed a camera 104 to photograph images formed on he screen of a radar image CRT 103.

Figure 11:
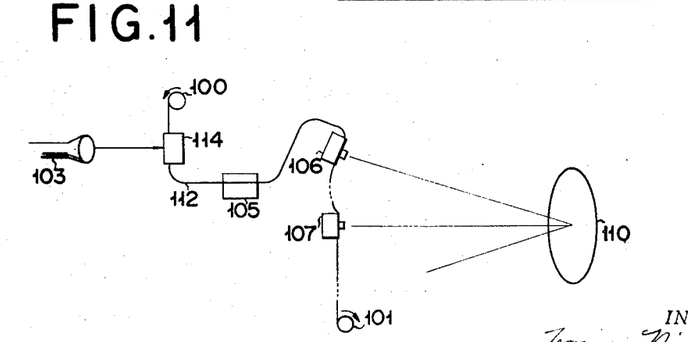

The exposed portion of the film 102 is developed in developing section 105 and carried forward to be wound about the takeup reel 101. Along the passage of the film 102 at a prescribed interval are located a plurality of projectors 106, 107 ... to project the images of the developed film 102. FIG. 10 shows a photographing and projecting device for composing images projected from the projectors 106, 107 ... on a single screen 110. The device of FIG. 11 is substantially the same as that of FIG 10 excepting that the photo film 102 is replaced by a film 112 for electrography (xerography, etc.) and the camera 104 is replaced by an electrographic camera 114. The same parts of an electrography-projection device of FIG. 11 as those of FIG. 10 are denoted by the same numerals and description thereof is omitted. FIG. 12 represents a scan converter tube 121 consisting of a composite tube involving a write-in radar information indicating tube 121a (radar scanning) and a read-out radar information indicating tube 121b (TV scan) for projecting images appearing on the former tube 121a and generating video signals corresponding to the projected images. Video signals from the scan converter tube 121 are recorded on a video tape 122 by a recording VTR 123. The recorded video signals are reproduced by a plurality of reproducing VTR's 124, 125 ... disposed at a prescribed interval along the passage of the video tape 122. Images corresponding to the video signals reproduced from said reproducing VTR's are reproduced on ordinary television receivers 131, 132 .... FIG. 12 illustrates an indicating system involving a scan converter, VTR and TV whereby the images projected from the television receivers 131, 132 ... are composed on a single screen 130. It will be apparent to those skilled in the art that the composite image-forming devices of FIGS. 9 to 12 display the same effect as the embodiment of FIGS. 3a and 3b.

What is claimed is:

1. A system for avoiding the collision of a subject moving body with other objects which comprises:
   means for storing information on the other objects including approaching dangerous objects obtained by radar observation as well as information on the subject moving body:
   means for displaying a first image picture indicative of the present information;
   means for displaying a second image picture corresponding to one or more data of past information by reading out information stored by said storing means;
   means for superposing said first and second image pictures by both said displaying means to enable observation of the relative positions of the subject moving body and the other objects including the approaching dangerous objects at the present and past moments; and
   means, operative whenever a collision of the subject moving body with any of the approaching dangerous objects is expected, for replacing that part of said second image picture component representing the subject moving body from said second picture displaying means with a new picture component based on estimated information to form a simulated trial image picture.

2. A system according to claim 1 wherein said storing means is a video tape recorder for storing in a video tape information on the other objects including the approaching dangerous objects and information on the subject moving body.

3. A system according to claim 1 wherein said storing means is a photographic film for recording pictures photographed by a camera from the images of the subject moving body and the other objects including the approaching dangerous objects which are displayed on the screen of a radar image indicating tube.

4. A system according to claim 3 wherein said photo film has a path of travel which extends between a feed reel and a takeup reel, and in which there is provided a plurality of projectors spaced longitudinally along the path of travel of said photo film and projecting onto a common screen the pictures recorded in said photo film, said common screen constituting said superposing means.

5. A system according to claim 1 wherein both said displaying means and said superposing means are combined in a multi-gun tube comprising a plurality of electron guns and deflectors, said multi-gun tube displaying on a single screen a plurality of images of the subject moving body and the other objects including the approaching dangerous objects at the present and past moments.

6. A system according to claim 1 wherein said storing means comprises a scan converter tube including a write-in cathode ray tube for forming the images of the subject moving body and the other objects including the approaching dangerous objects and a read-out cathode ray tube for generating video signals representing the images on said write-in cathode ray tube; and a video tape recorder for recording on a video tape video signals from said read-out cathode ray tube.

7. A system according to claim 6 wherein there are further provided a plurality of reproducing video tape recorders spatially disposed along the passage of said video tape recorded with the video signals from said scan converter by said recording video tape recorder; and a plurality of television receivers for displaying on their screens respective images corresponding to the video signals reproduced from said reproducing video tape recorders and for projecting on a common screen the respective images displayed on said television receivers, said common screen constituting said superposing means.

8. A system according to claim 1 wherein said first image picture displaying means comprises a cathode ray tube.

9. A system according to claim 1 wherein said second image picture displaying means comprises a cathode ray tube.

10. A system according to claim 1 wherein said first and second image picture displaying means comprises cathode ray tubes, and said superposing means comprises a translucent mirror for superposing the first and second image pictures by said both displaying means thereof.

11. A system according to claim 10 wherein both said cathode ray tubes respectively are a visible storage tube scanned by a first scanning line for displaying the images on the screen and also by a second scanning line used for their erasure, said second scanning line preceding said first scanning line.

12. A system according to claim 10 wherein said cathode ray tube for said first image picture displaying means and said cathode ray tube for said second image picture displaying means are each provided respectively with a means for distinguishing the separate images displayed on the screens of the both cathode ray tube.

13. A system according to claim 10 wherein both said cathode ray tubes display the images on their respective screens by a system of denoting their relative motions and relative bearings and are each provided at least on the outside with at least a means for switching the system of indication over to one exhibiting their relative motions and true bearings.

14. A system according to claim 1 wherein said second picture displaying means and said replacing means are combined as a storage tube display having an input source of actual information supplied, during times when a trial operation is not being conducted, with the actual past information obtained through said storing means on the subject moving body as well as on the other objects including the approaching dangerous objects, and has an input source of a forecast information supplied during the time a trial operation is being conducted, and with a simulating trial information formed by the estimated information instead of that part of the actual past information component representing the subject moving body included in the actual information input source.

15. A system according to claim 14 wherein said actual information input source for said storage tube display comprises a multiplier which is supplied with a signal representing the actual past speed of the subject moving body obtained through said storing means and is designed to determine the distance to be displayed on said storage tube display through which the subject moving body traveled in the past; and a resolver coupled with said multiplier, supplied with a signal representing the actual past bow bearings of the subject moving body obtained through said storing means and adapted to generate two signal components resolved into a horizontal component and a vertical component, and wherein said forecast information input source for said storage tube display comprises another multiplier which is supplied with a signal representing a speed of the estimated information and is designed to determine the distance to be displayed on said storage tube display through which the subject moving body is supposed to have traveled in the past; and another resolver coupled with said another multiplier, supplied with a signal representing bow bearings of the estimated information which the subject moving body is supposed to have traveled in the past and adapted to generate two signal components resolved into a horizontal component and a vertical component, said two horizontal components and two vertical components from said both resolvers being independently subjected to relative vector summing upon the simulating trial operation so as to drive the off center coil assembly of said storage tube display through a switch closed upon the trial operation.

16. A system according to claim 15 wherein both said multipliers comprise a plurality of serially connected resistors and a switch means for changing over the terminals of said resistors.

* * * * *